United States Patent [19]
Wafer et al.

[11] Patent Number: 5,404,615
[45] Date of Patent: Apr. 11, 1995

[54] HANDLE

[75] Inventors: Don B. Wafer, Spring; Michael R. Williams, Houston; Richard D. Van Orsdale, The Woodlands; Orlando A. Mejia, Houston, all of Tex.

[73] Assignee: FMC Corporation, Chicago, Ill.

[21] Appl. No.: 968,615

[22] Filed: Oct. 29, 1992

[51] Int. Cl.⁶ .................... F16K 31/00; F16K 37/00
[52] U.S. Cl. .................... 16/114 R; 74/528; 811/177.2; 251/93
[58] Field of Search ............... 16/114 R; 74/528, 557; 81/177.2, 177.5; 251/93

[56] References Cited

U.S. PATENT DOCUMENTS

| | | | |
|---|---|---|---|
| 1,355,544 | 10/1920 | Drane et al. | |
| 1,413,698 | 4/1922 | Adams | 81/177.5 |
| 1,460,922 | 7/1923 | Saunders | 74/557 |
| 1,810,715 | 6/1931 | Larson et al. | |
| 2,142,589 | 1/1939 | Olson | 81/177.2 |
| 4,596,167 | 6/1986 | White, Jr. | 81/177.2 |
| 5,001,947 | 3/1991 | Andersen-Vie | 81/177.2 |
| 5,020,397 | 6/1991 | Minuto | 81/177.2 |
| 5,025,826 | 6/1991 | Schoepe et al. | 137/315 |
| 5,216,781 | 6/1993 | Brondfield | 16/114 R |

FOREIGN PATENT DOCUMENTS

| | | |
|---|---|---|
| 416138 | 1/1934 | United Kingdom . |
| 1091765 | 11/1967 | United Kingdom . |

Primary Examiner—David Jones
Attorney, Agent, or Firm—Henry C. Query, Jr.

[57] ABSTRACT

A handle for imparting rotational motion to a rotationally-operable device, which comprises an elongated arm having hub means for detachably connecting the handle to the rotationally-operable device, a hand grip attached to one end of the arm, and yoke means attached to the distal end of the arm.

5 Claims, 4 Drawing Sheets

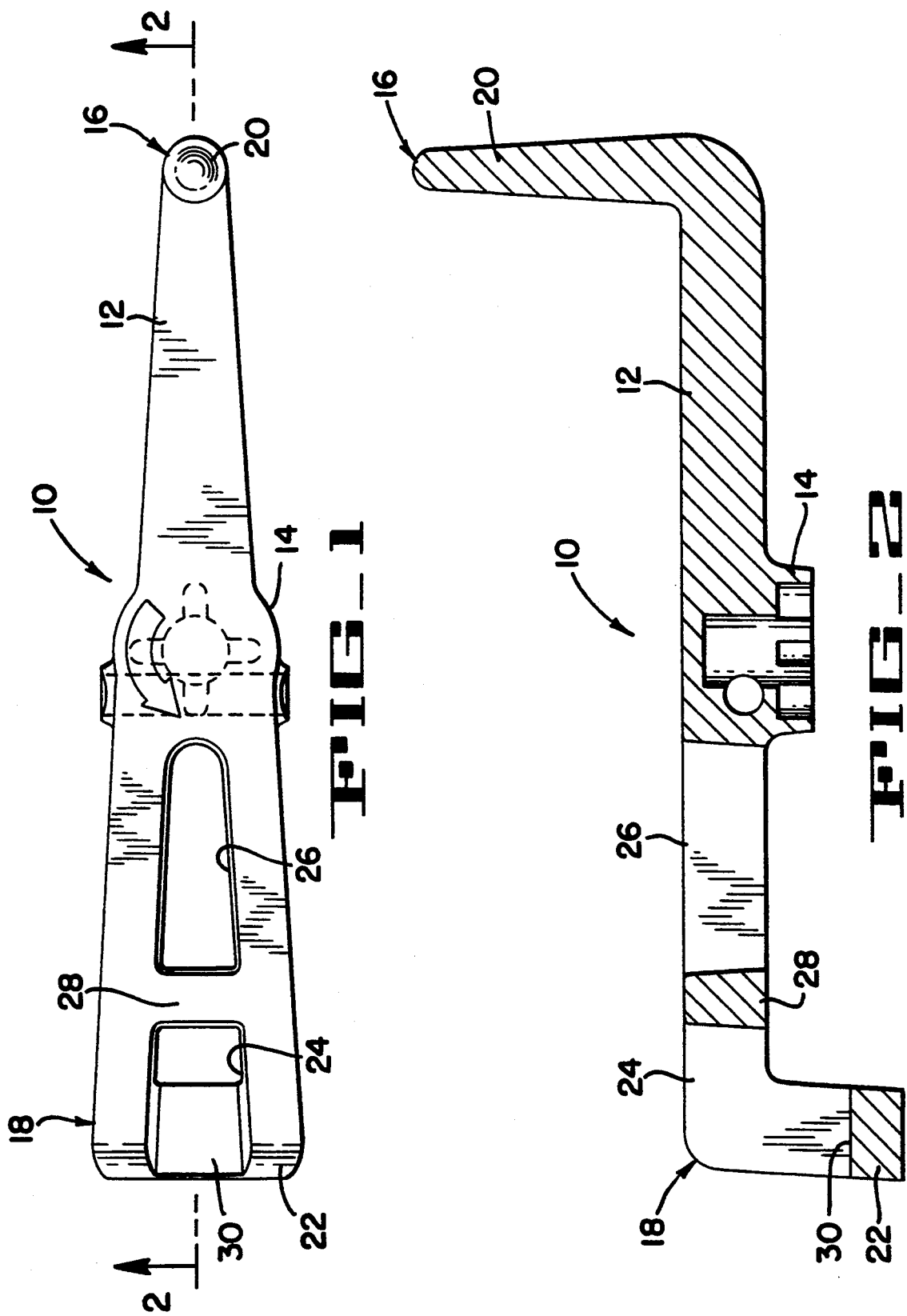

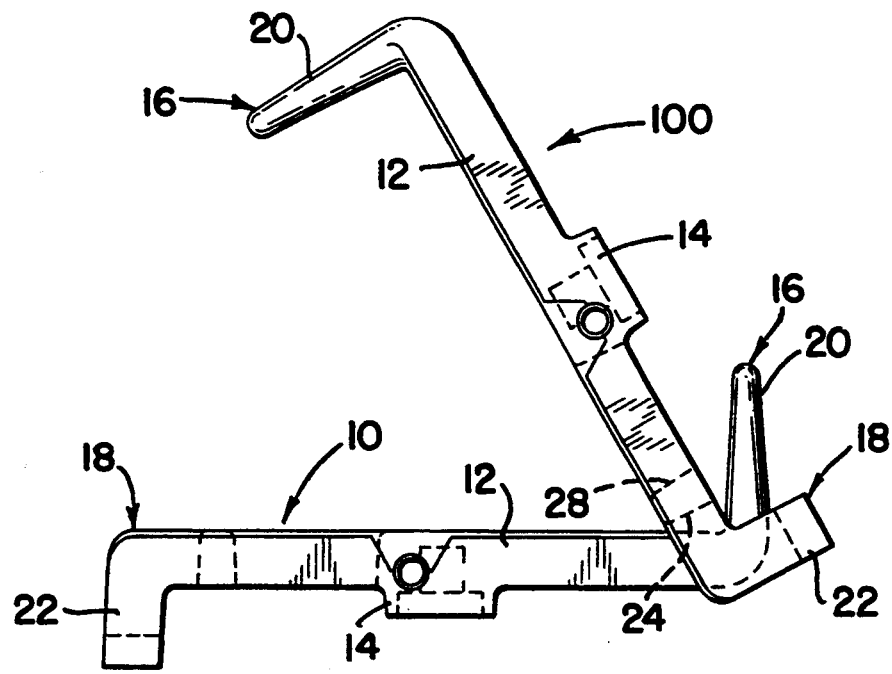
FIG_3
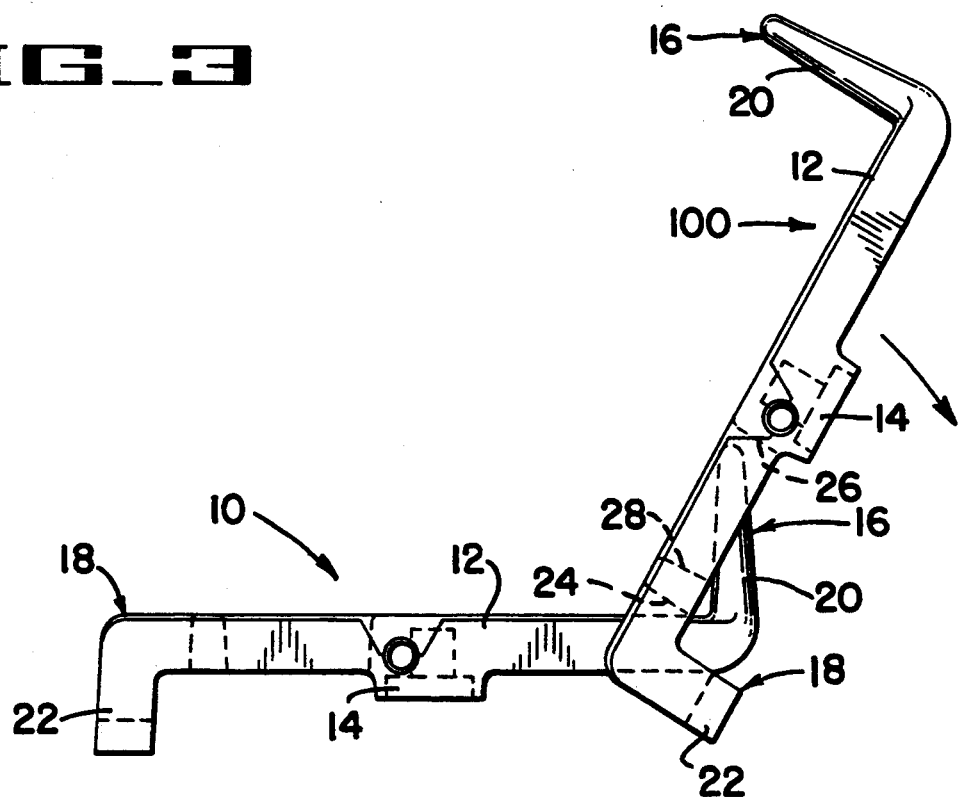
FIG_4

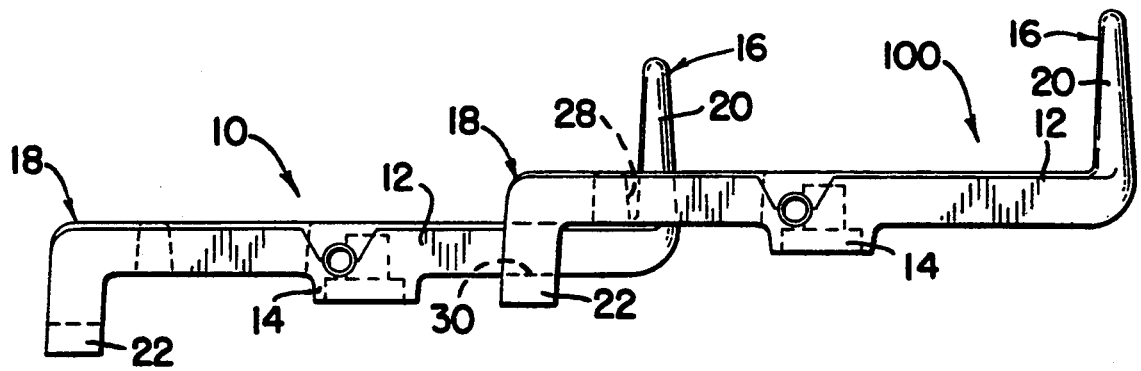
FIG_5
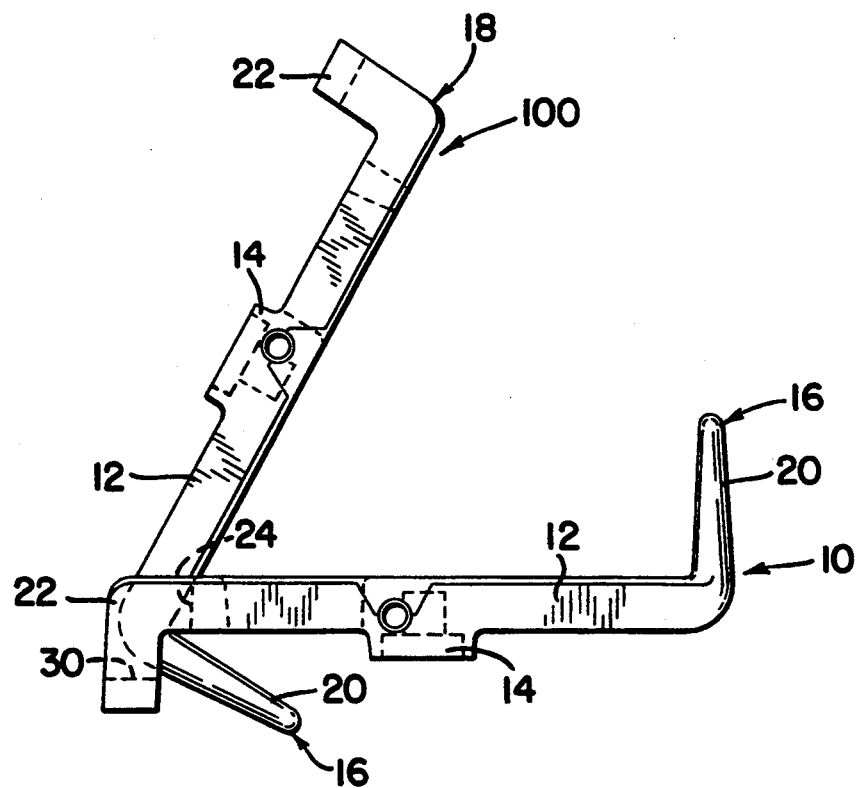
FIG_6

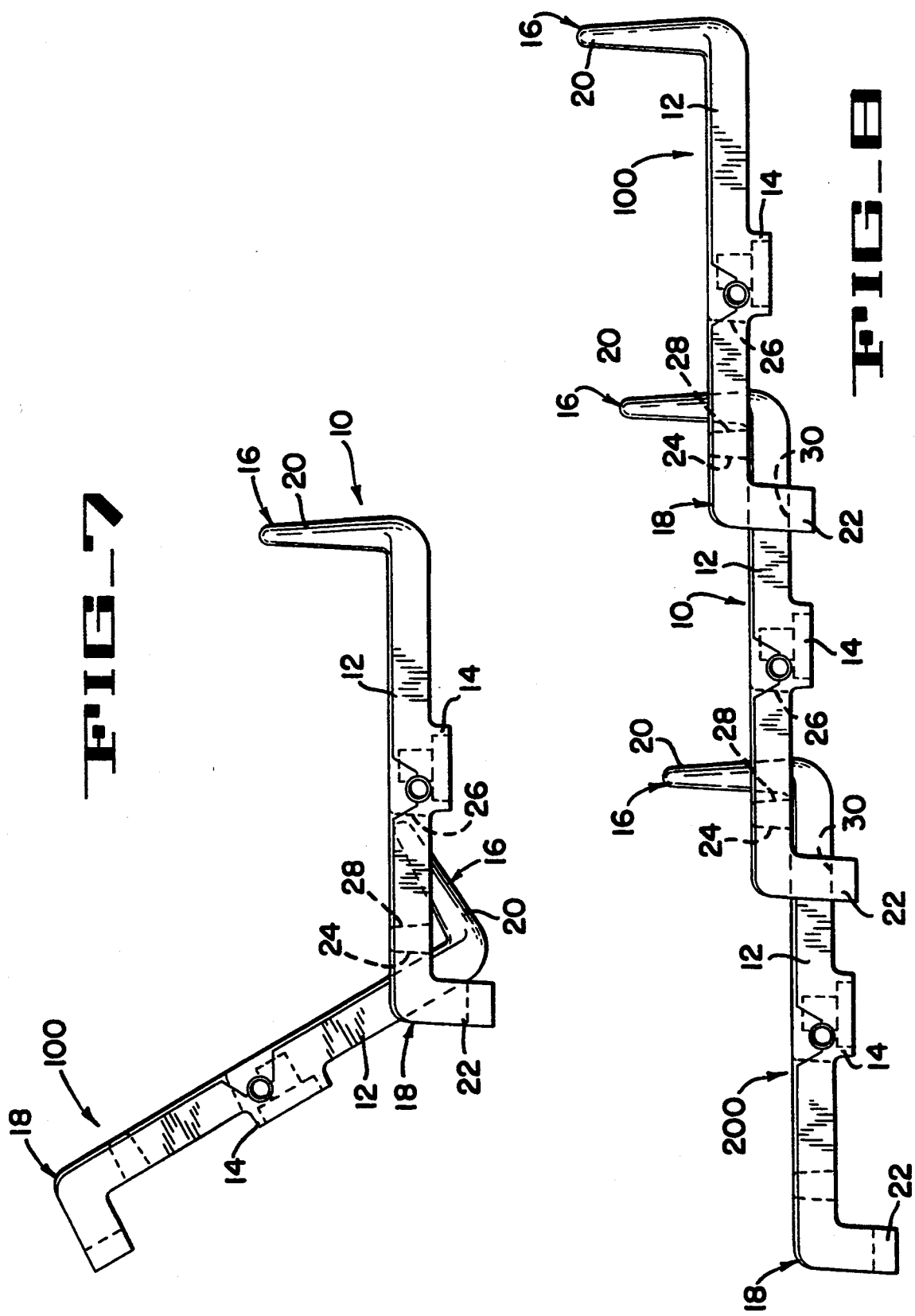

HANDLE

FIELD OF THE INVENTION

This invention relates to handles used to impart rotational motion to rotationally-operable devices. More particularly, the invention relates to handles used to open and close manually-operable valves.

BACKGROUND OF THE INVENTION

An example of a rotationally-operable device in connection with which a handle is used to impart the rotational motion is a gate valve, such as is used in a wellhead. Typically, the type of handle used to open and close a gate valve is a handwheel. The size of the handwheel is usually dictated by the diameter of the flange of the gate valve; and since flange dimensions are established by an independent organization responsible for standardizing wellhead equipment, the size of the handwheel is normally limited and unchangeable. While under normal conditions the handwheel may be sufficient to open and close the gate valve, many times the valve will become stuck, thus requiring additional torque to open or close the valve. In these instances, the standard handwheel may not provide a moment arm long enough to allow the operator to generate the additional torque without the assistance of special tools.

SUMMARY OF THE INVENTION

Therefore, it is an object of the present invention to provide a handle which can be used to impart rotational motion to rotationally-operable devices. Another object of the invention is to provide such a handle which can be used in applications, such as wellhead gate valves, in which the size of the handle is limited by industry standards or practical considerations. A further object of the invention is to provide a handle which has a rugged construction but can also be adapted to effectively increase the moment arm of the handle in order to generate additional torque, when required.

According to the present invention, these and other objects and advantages are achieved by providing a handle comprised of an elongated arm section having a centrally located hub section adapted to be detachably connected to the valve stem and shear pin assembly of a valve, an operative end to which the manual force is applied, and a conjunctive end which, when the handle is used with a second such handle, is designed to be coupleable with the operative end. The operative end comprises a hand grip, which in the preferred embodiment extends perpendicularly upwardly from the arm. The conjunctive end comprises a yoke, an opening adjacent the yoke, a slot extending longitudinally from the hub section and a brace member located between the opening and the slot. The length of the handle is selected to allow it to be used in applications where size is limited by industry standards or practical considerations. Furthermore, the handle is constructed of a strong, durable material, such as steel, and it is portable and easily transferrable from valve to valve due to the detachable connection of the hub section to the valve stem.

In many applications, multiple valves are located in close proximity to each other. The fewest number of valves on a wellhead is normally two. Thus, if one or more of the valves becomes stuck or otherwise requires more torque be applied than is possible to generate with a single handle, two handles can be advantageously connected in order to create a longer moment arm, or effectively increase the moment arm of the first handle which is connected to the valve stem. This eliminates the need for special tools or torque multipliers.

The handles of the present invention are connected by coupling the conjunctive end of a second handle with the operative end of the first handle, or vice-versa. More specifically, the opening of the second handle is placed over the hand grip of the first handle, and the second handle is rotated in a plane defined by the arm and grip of the first handle until the top of the grip projects though the slot of the second handle. The second handle is then rotated further until the bottom of the brace member of the second handle engages the top of the arm of the first handle. In this position, the portion of the arm of the first handle adjacent the grip is trapped within the yoke and between the top of the bottom portion of the yoke and the underside of the brace member of the second handle. In addition, rotational motion of the second handle with respect to the first handle in a plane transverse to the valve stem is prevented by the engagement of the grip and arm of the first handle within the slot and yoke, respectively, of the second handle. The moment arm applied to the valve stem is therefore lengthened. Thus, applying a force to the grip of the second handle results in a greater torque being generated at the valve stem than is possible by applying the same force to the grip of the first handle.

An additional advantage of the present invention is that, due to the advantageous design of the operative and conjunctive ends, any size handle of the present invention can be interlocked with any other size such handle.

These and other objects and advantages of the present invention will be made apparent from the following detailed description, with reference to the accompanying drawings.

BRIEF DESCRIPTION OF THE DRAWINGS

FIG. 1 is a top plan view of the handle of the present invention;

FIG. 2 is a cross-sectional view of the handle of the present invention taken along line 2—2 of FIG. 1;

FIG. 3 is a side elevation view of two handles of the present invention in the initial stage of coupling;

FIG. 4 is a side elevation view of the handles of FIG. 3 in an intermediate stage of coupling;

FIG. 5 is a side elevation view of the handles of FIG. 4 fully coupled;

FIG. 6 is a side elevation view of two handles of the present invention in the initial stage of coupling in another manner;

FIG. 7 is a side elevation view of the handles of FIG. 6 in an intermediate stage of coupling; and FIG. 8 is side elevation view of three handles of the present invention fully coupled.

DETAILED DESCRIPTION OF THE PREFERRED EMBODIMENT

Referring to FIGS. 1 and 2, the handle of the present invention, indicated generally by reference numeral 10, comprises an elongated arm 12 having a centrally located hub section 14 which is adapted to be detachably connected with the valve stem and shear pin assembly of a valve (not shown), as is well known in the art. Arm 12 further comprises an operative end 16 and a conjunctive end 18, which, when handle 10 is used in combination with a second such handle, is designed to be coupleable with end 16 to effectively increase the moment arm of handle 10, as will be described.

More specifically, operative end 16 comprises a hand grip 20 which preferably extends perpendicularly upwardly from arm 12. Conjunctive end 18 comprises a U-shaped yoke 22 extending perpendicularly downwardly from arm 12, an opening 24 adjacent yoke 22, an elongated slot 26 extending longitudinally from adjacent hub section 14 toward opening 24, and a brace member 28 located between opening 24 and slot 26. The vertical distance between the top 30 of the bottom portion of yoke 22 and the underside of brace member 28 generally corresponds to the thickness of the portion of arm 12 between grip 20 and hub section 14.

Handle 10 is preferably constructed of a strong, durable material, such as steel, and grip 20, yoke 22 and brace 28 may be either manufactured together with arm 12 in a single casting operation or manufactured separately and attached to arm 12 by any appropriate means.

In operation, handle 10 is removably connected via hub section 14 to the valve stem of a valve (not shown) to provide a convenient means for manually opening and closing the valve. When a valve requires more torque be applied to open or close it, additional such handles can be coupled with handle 10 to effectively increase the moment arm of handle 10 and thereby enable additional torque to be generated while reducing the amount of force a person would otherwise be required to exert to open or close the valve. To simplify this description, a second and third such handles will be referred to and indicated in the drawings by reference numerals 100 and 200. It is to be understood that handles 100 and 200 are identical to handle 10, and therefore the same reference numerals will be used to describe elements identical to those previously described for handle 10. Handles 100 and 200 may be of different lengths than handle 10; however, a feature of the present invention is that handles of different sizes may be combined as hereinafter described to achieve the desirous effects of the present invention.

The coupling of handles 10 and 100 is best described by reference to FIGS. 3 through 5. Referring to FIG. 3, handles 10 and 100 are coupled by initially placing the conjunctive end of handle 100 over the operative end of handle 10 so that grip 20 of handle 10 extends through opening 24 of handle 100. Handle 100 is then rotated, clockwise as viewed in FIG. 4, until grip 20 of handle 10 projects through slot 26 of handle 100, as shown in FIG. 4. Handle 100 is then rotated further until the underside of brace 28 of handle 100 engages the top of arm 12 of handle 10, as shown in FIG. 5. In this position, the portion of arm 12 of handle 10 between hub section 14 and grip 20 is captured firmly within yoke 22 of handle 100 and between the underside of brace 28 and the top 30 of yoke 22 of handle 100. Handle 100 may also be coupled with handle 10 as shown in FIGS. 6 and 7, wherein grip 20 of handle 100 is inserted through opening 24 of handle 10 and handle 100 is rotated, counterclockwise as viewed in FIGS. 6 and 7, until the top of arm 12 of handle 100 engages the underside of brace 28 of handle 10. Relative movement of handle 100 with respect to handle 10 is prevented by the engagement of arm 12 and grip 20 of handle 100 within yoke 22 and slot 26, respectively, of handle 10. Applying a force to hand grip 20 of handle 100 (for the engagement illustrated in FIGS. 3 and 4), or to conjunctive end 18 of handle 100 (for the engagement illustrated in FIGS. 6 and 7), results in a greater torque being applied to the valve stem connected to hub section 14 of handle 10 than would be generated by applying the same force to grip 20 of handle 10.

It should be understood from the above description that additional handles may be combined with handle 10 to more easily generate the additional torque that may be required to open or close a particular valve. For example, FIG. 8 illustrates two additional handles, handles 100 and 200, in combination with handle 10, which would be connected to the valve stem of a valve (not shown). Handles 100 and 200 are coupled with handle 10 in a manner described above to effectively increase the moment arm of handle 10.

It should be recognized that, while the present invention has been described by reference to the preferred embodiment thereof, those skilled in the art may develop a wide variation of structural details without departing from the principles of the invention. Therefore, the appended claims are to be construed to cover all equivalents falling within the true scope and spirit of the invention.

What is claimed is:

1. A handle for imparting rotational motion to a rotationally-operable device, which comprises:
   an elongated arm having hub means for detachably connecting the handle to the rotationally-operable device;
   a hand grip attached to one end of the arm;
   yoke means attached to the distal end of the arm for engaging a hand grip of a second such handle;
   wherein the hub means is located between the hand grip and the yoke means; and
   wherein the yoke means comprises a U-shaped member extending perpendicularly from the end of the arm.

2. The handle of claim 1, wherein the arm comprises an opening adjacent the yoke means, a slot extending longitudinally from adjacent the hub means toward the opening, and a brace located between the opening and the slot.

3. A handle for imparting rotational motion to a rotationally-operable device, which comprises:
   an elongated arm having hub means for detachably connecting the handle to the rotationally-operable device;
   the arm having an operative end and a conjunctive end;
   the hub means being located between the operative end and the conjunctive end;
   wherein the operative end and the conjunctive end are designed so that the operative end is coupleable with the conjunctive end of a second such handle;
   wherein the conjunctive end comprises a yoke means for engaging the operative end of the second such handle; and
   wherein the conjunctive end further comprises a slot extending longitudinally from adjacent the hub means toward the yoke means and the operative end comprises a hand grip extending perpendicularly from the arm.

4. A handle for imparting rotational motion to a rotationally-operable device, which comprises:
   an elongated arm having hub means for detachably connecting the handle to the rotationally-operable device;
   a hand grip attached to one end of the arm;
   a yoke attached to the distal end of the arm;

wherein the yoke comprises a U-shaped member extending perpendicularly from the end of the arm; and wherein the arm comprises an opening adjacent the yoke, a slot extending longitudinally from adjacent the hub means toward the opening, and a brace located between the opening and the slot.

5. The handle of claim 4, wherein the hand grip extends perpendicularly from the arm, and the opening and the slot of a second such handle can be positioned around the hand grip and the arm to secure the arm within the yoke and brace of the second such handle.

* * * * *